United States Patent [19]
Pincus

[11] 3,719,882
[45] March 6, 1973

[54] RESONANT CIRCUIT APPARATUS FOR DETECTING ELECTROMAGNETIC CONDUCTIVE BODIES

[76] Inventor: Anthony Godfrey Pincus, 1057 Don Mills Road, Apt. 204, Don Mills, Ontario, Canada

[22] Filed: Nov. 12, 1970

[21] Appl. No.: 88,944

[52] U.S. Cl. ...........................324/3, 324/5, 324/41
[51] Int. Cl. ............................G01v 3/10, G01v 3/16
[58] Field of Search...........................324/3–6, 7, 41

[56] References Cited

UNITED STATES PATENTS

| | | | |
|---|---|---|---|
| 3,014,176 | 12/1961 | McLaughlin et al. | 324/4 |
| 3,555,408 | 1/1971 | Robinson | 324/4 |

FOREIGN PATENTS OR APPLICATIONS

| | | | |
|---|---|---|---|
| 860,197 | 2/1961 | Great Britain | 324/41 |
| 574,808 | 1/1946 | Great Britain | 324/3 |

*Primary Examiner*—Gerard R. Strecker
*Attorney*—Douglas S. Johnson

[57] ABSTRACT

An apparatus for detecting the presence of electromagnetic conductive bodies comprises two coils which are coupled through a high gain, high impedance amplifier and tuning capacitor with the other end of each coil going to ground so as to form a tank circuit. The coils are mounted so as to be essentially de-coupled with their axes mutually perpendicular. One of the coils is self resonant with a natural resonant frequency in the audio range. The circuit is tuned to the natural resonant frequency by the tuning capacitor and inductive coupling between the coils improves when the circuit is near an electromagnetic conductive body. A capacitor circuit is employed to detect and measure shift in one or more of the tank circuit parameters including output signal level, frequency and phase.

6 Claims, 4 Drawing Figures

*INVENTOR.*
ANTHONY G. PINCUS

BY Douglas S. Johnson

Attorney 3,719,882

RESONANT CIRCUIT APPARATUS FOR DETECTING ELECTROMAGNETIC CONDUCTIVE BODIES

BACKGROUND OF THE INVENTION

This application relates to an electromagnetic detector apparatus, and more particularly to an apparatus for detecting electromagnetic conductive bodies such as mineral ore bodies. The invention provides a passive circuit arrangement — i.e., one which has no transmitter — and which does not rely on external alternating fields as the signal source. Rather, this invention provides a tuned, but de-coupled, tank circuit which functions essentially as a Q-multiplier when the coefficient of coupling between coils within the tank circuit is improved. The invention lends itself to be towed in a "bird" from an aircraft in aeromagnetic survey procedures, or towed from a boat in survey operations carried out on bodies of water such as lakes, or as a fixed and static system in an installation such as a metal detector for aircraft luggage and passengers.

The tank circuit of the present invention employs a positive feedback loop through a common or "circuit ground" connection between the decoupled coils. Thus, external noise which may be effected by the coupling coefficient may be overcome to some extent, as discussed hereafter. At the same time, penetration characteristics with respect to ore body overburden etc. may be adjusted, and quantitative survey results may be determined having regard to the amount of electromagnetic conductor deposit (e.g., metallic sulphide bodies) there may be in any given circumstances.

The present invention has very low power demand because it does not rely on a transmitter. Frequencies used in the circuit of the present invention are most generally in the audio range so that very simple indicating apparatus may be used to indicate the detection of an electromagnetic conductor body by the apparatus. The indicating devices may include simple audio amplifiers and output speakers, as well as more sophisticated display and recording apparatus such as oscilloscopes, strip recorders, etc.

While the electromagnetic detector apparatus of this invention utilizes two coils having fixed spacial relationships one to the other, the spacing between them is sufficiently small that a "bird", float or other suitable housing for at least the tank circuit or tuned circuit portion of the apparatus may be deployed from survey vehicles including helicopters, fixed wing aircraft, boats, etc. without the necessity for fixed coil mountings on the survey vehicle. As noted, the present invention employs a positive feed-back loop in the tuned circuit portion thereof, and also comparator circuit means whereby the shift of a parameter of the signal within the tuned circuit due to an increase in coupling between the coils thereof is detected — the parameter shift being expressed in terms of the comparison of the signal parameter to the state thereof when the tuned circuit is in its quiescent state. Therefore, the circuit of the present invention tends to eliminate noise from the output of the apparatus and the levels thereof, thereby permitting detector calibration for quantitative survey procedures.

The trade magazine "Mining in Canada", in an article published in its edition of May, 1969 at pages 19 to 28, gives a comprehensive summary of the applications and limitations of airborne electromagnetic systems in mineral exploration, as they were known at that time. The article particularly explains the differences between rigid boom systems and towed bird systems, which are active or transmitter-activated systems; passive and fixed source systems, including AFMAG and VLF systems; and other semi-airborne systems having ground to air transmission. Some of the systems discussed are multiple frequency systems, and most rely on orthogonal signal components transmitted and received using coils having fixed spacings and orientations; and the analysis of the orthogonal components of such transmitted and received signals. Many difficulties arise in such systems where one or the other of a transmitter or receiver may drift in frequency, or where detection of one or another of the components of a complex signal may be dropped from the signal analysis apparatus because of signal blocking, circuit or component failure, etc.

The present invention, being passive, and relying on coil separation and orientation within a limited spacial volume and therefore irrespective of the survey vehicle or method, and relying instead on the Q-multiplier effect of a detected electromagnetic conductive body with respect to the tuned but decoupled tank circuit, overcomes many of the difficulties of the prior art apparatus and does so with much lower power requirement and lower component costs.

SUMMARY OF THE INVENTION

This invention provides a low cost, portable, low power electromagnetic conductive body detecting apparatus.

The invention further provides a detector apparatus, including a tuned, decoupled tank circuit and a comparator circuit for detecting and signifying a shift of parameter of the signal in said tank circuit as compared to the state of the parameter of the signal in said tank circuit when it is in its quiescent state.

BRIEF DESCRIPTION OF THE DRAWINGS

The invention herein disclosed is discussed in greater detail in association with the accompanying drawings in which.

DESCRIPTION OF THE PREFERRED EMBODIMENT

Figure 1:
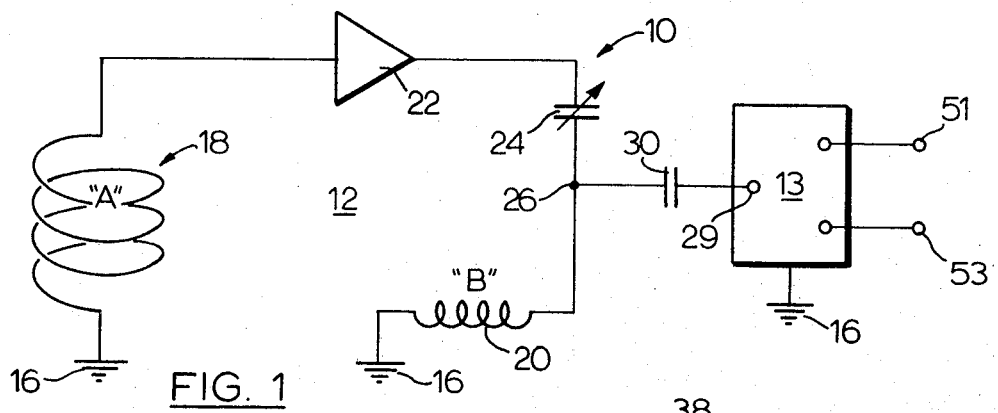
FIG. 1 is a block schematic of a general circuit for the detector apparatus of the present invention.

The basic circuit for the electromagnetic conductive body detector apparatus according to this invention is indicated in FIG. 1 at 10, and comprises a tank or tuned circuit 12 and a comparator circuit 13. All voltages appearing in the detector circuit, both in the tuned circuit 12 and the comparator circuit 13, can be taken relative to a system or circuit ground potential through the circuit ground indicated at 16.

The tuned circuit includes an "A" coil 18, a "B" coil 20, an amplifier 22 and a tunable condenser 24. An output from the tunable circuit 12 is taken at 26, between tunable condenser 24 and coil 20.

Figure 2:
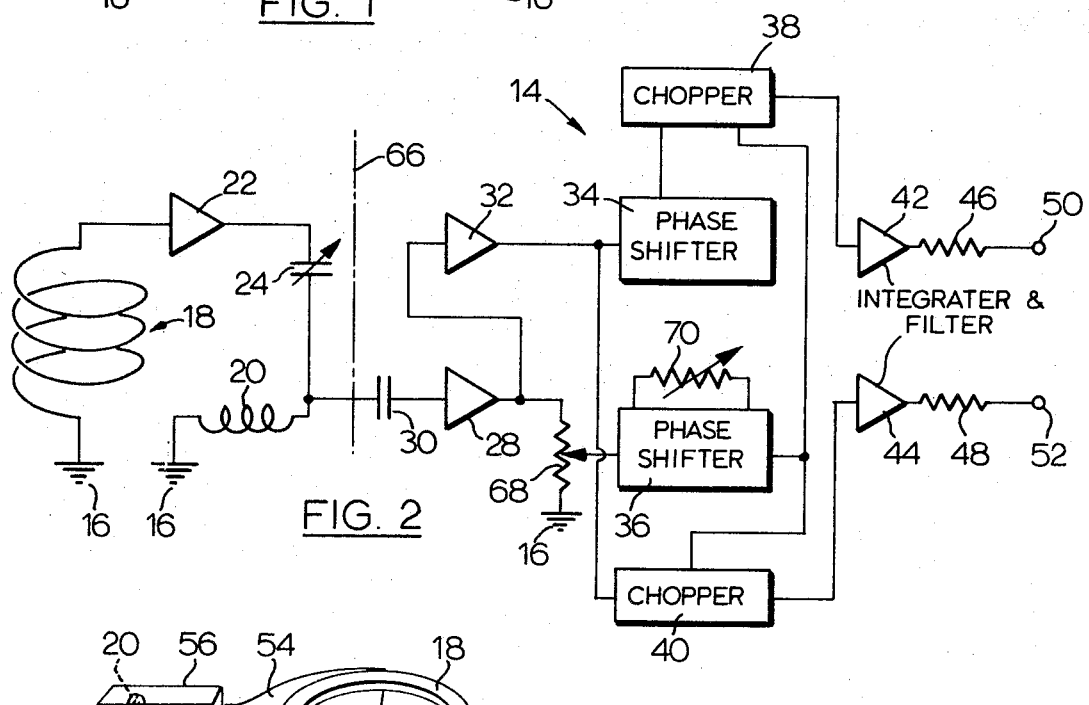
FIG. 2 is a block schematic of a detector apparatus according to the present invention, including a specific comparator circuit.

The general circuit of FIG. 1 also shows a comparator circuit 13 having an input 29, through DC blocking capacitor 30, and outputs at 51 and 53. As indicated above, all circuit voltages may be taken relative to the circuit ground 16. The multiple outputs as indicated at 51 and 53 may be provided so as to give quadrature or other phase shifted outputs, high- and low-level outputs, etc. from the comparator 13. In any event, the comparator circuit 13 is such that it includes means to indicate a shift of a signal parameter of the signal received at input 29 from the tuned detector circuit 12, the parameter shift being in terms of a comparison made in the comparator circuit 13 of the shifted signal parameter to the state of the signal parameter when received from the tuned detector circuit 12 when it is in its quiescent state. The parameter shift is indicated by reading the output of the comparator circuit at 51 or 53, or both. Signal parameters such as phase, frequency and level may be compared in the comparator circuit 13 with a standard which has previously been adjusted so as to equate to or represent the state of a particular signal parameter received from the quiescent tuned detector circuit 12. Thus, calibration of the comparator circuit to indicate quantitative parametric shift may be arranged in a particular comparator, and assay or other quantitative output reading may be derived. The comparator circuit 14 of FIG. 2 represents a particular comparator in which phase shift of the signal in the tuned detector circuit 12 is noted. The comparator circuit 14 includes an input amplifier 28 driven from the output 26 of the tuned circuit 12 through a DC blocking capacitor 30. A reference amplifier 32, a 90° phase shifter 34, a 0°– 180° phase shifter 36, self-exciting choppers 38 and 40, integrater and filter networks 42 and 44 and output impedances 46 and 48 to output terminals 50 and 52 respectively are the other, chief components of the comparator circuit 14.

Figure 3:
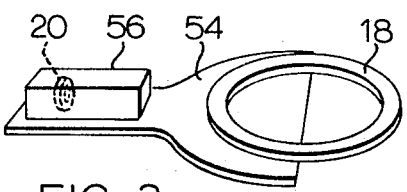
FIG. 3 is a block perspective drawing showing the relationship of the coils in the tuned circuit, according to this invention.

FIG. 3 demonstrates the manner in which certain of the components of the detector apparatus, particularly the components of the tuned circuit 12, may be mounted. A support 54 has a chassis 56 mounted thereon, within which may be mounted the components comprising amplifier 22 and the tuned capacitor 24. As well, coil 20 is mounted on or within the chassis 56; and, in any event, is mounted so as to be rigidly, mechanically fixed with respect to coil 18 which is mounted on support 54. In the orientation of the coils 18 and 20 as indicated in FIG. 3, coil 18 is horizontal and coil 20 is vertical so that their inductive axes are vertical and horizontal respectively; that is, the inductive axes of coils 18 and 20 are mutually perpendicular.

Figure 4:
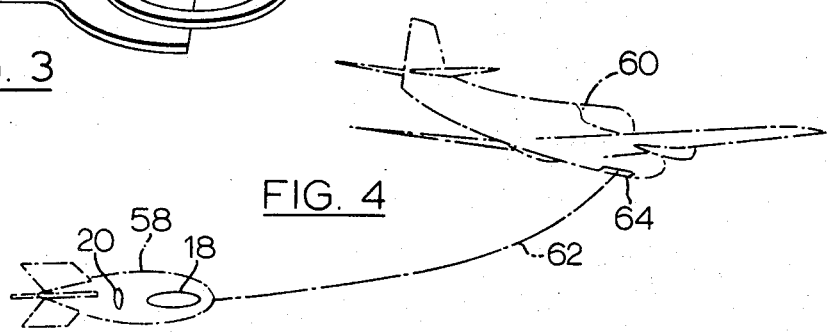
FIG. 4 is a view showing a typical manner in which apparatus according to this invention might be employed in air-borne electromagnetic survey procedures.

In FIG. 4, coils 18 and 20 are shown mounted in a "bird" 58 which is connected to and communicated with an aircraft 60 by tow cable 62. The housing of the bird 58 is non radio-inductive; and the tow cable 62 includes within it all of the necessary cable means for electrical connections between the tuned circuit which is mounted in bird 58 and a comparator circuit 13 carried at 64 in aircraft 60. Thus, the tuned circuit 12 and comparator circuit 13 are electrically interconnected by such as tow cable 62; which is also indicated at the dot-dash line 66 in FIG. 2.

It has been noted that the reference numeral 12 indicates a tuned circuit. The circuit is therefore tunable; and since the tunable circuit 12 acts as a tank circuit, with a substantially controllable Q-multiplier effect, the circuit is a resonant circuit. However, as noted, the coupling between the "A" and "B" coils 18 and 20 respectively is very low.

Coil 18 is a self-resonant coil with a natural resonant frequency which is generally chosen to be somewhere in the audio range; e.g., between 200 Hz and 10 KHz. Depending on the survey procedure to be carried out using the apparatus of this invention, the natural resonant frequency required for coil 18 may differ. Therefore, coil 18 is physically mounted to support 54 in such a manner that it can be removed and replaced with a different coil having a different natural resonant frequency. In like manner, in order that the tank circuit may be tuned to the resonant frequency of self-resonant coil 18, the tunable capacitor 24 is conveniently mounted on chassis 56 so that it may be removed therefrom and replaced by another capacitor of different value, when so required. The amplifier 22 is inserted in the tank circuit, and its out-put appears, through condenser 24, at output 26. Amplifier 22 may be driven from a source such as the self-exciting chopper 38 in comparator circuit 14 as discussed hereafter, and has a high input impedance.

As noted, the effective coupling between coils 18 and 20 is minimal in the absence of any external electromagnetic conductive body. There will be some coupling, however, sufficient that, with the presence of amplifier 22, the tank circuit may be tuned by adjusting tunable capacitor 24 so that an output from the tuned circuit appears at 26, and at the self-resonant frequency of the coil 18. In those conditions, the tuned circuit is in its tuned, but de-coupled state; which is to say, its quiescent state. It will be understood that the operation of the tuned detector circuit 12 will be effectively the same regardless of the comparator circuit employed.

Referring to the comparator circuit 14, that circuit is adjusted when the tuned circuit is in its quiescent state so that minimum output appears at output terminals 50 and 52. The operation of the comparator circuit will become more clear during the following discussion.

The input to the comparator circuit 14 is at the input to amplifier 28, which has a very high input impedance — generally, in the order of 20 Megohms — so as to avoid loading the tuned circuit 12. The signal from the output of the input amplifier 28 is fed to a gain control 68, and to a reference amplifier 32. Considering first the signal as it is taken from reference amplifier 32, that signal is split and is fed to a phase shifter 34 wherein the phase of the signal is shifted 90°, and also to the high level input of self-exciting chopper 40. The high level input of self-exciting chopper 38 is fed from the 90° phase shifter 34 so that the high level inputs to choppers 38 and 40, when tuned circuit 12 is in a quiescent state, are in quadrature. The output of the chopper 38 is fed through an integrater and filter network 42 and an impedance 46 to output terminal 50.

The signal appearing at the gain control 68 is taken from the wiper thereof to a phase shifter 36 which is capable, by means of phase shift control 70, of shifting the phase of the signal fed thereto so as to have a phase shift of from zero to 180°. In any event, with the tuned circuit 12 in a quiescent state, the phase shifter 36 is adjusted to shift the phase 90°, and its output is fed to the low level input of each of choppers 38 and 40. It will thus be seen that both the high and low level inputs to chopper 38 are in phase, both having been shifted 90° in phase by phase shifters 34 and 36 respectively, and that the self-exciting chopper 38 is operable as an "in-phase sync. detector". The chopper 38 is adjusted for an output compatible with the integrater and filter network 42 and the readout or display equipment which may be connected at output terminal 50, as discussed hereafter.

In the same manner, it will be noted that the high and low level inputs to the self-exciting chopper 40 are in quadrature, the low level input only being shifted 90° by phase shifter 36. The self-exciting chopper 40 thereby acts as a "quadrature sync. detector"; and its output is fed to the integrater and filter network 44, and thence to output impedance 48 and output terminal 52, in the same manner as the output from chopper 38. In the usual circumstances, choppers 38 and 40 are adjusted for nil output — or minimum output — when the tuned circuit 12 is in its quiescent state.

When the tuned circuit 12, which, as noted, is a resonant circuit, is brought into the vicinity of an electromagnetic conductive body such as a metal article or a metallic sulphide ore body, the co-efficient of coupling between coils 18 and 20 will improve, in a Q-multiplier effect. As the coupling between coils 18 and 20 improves, a frequency and phase shift of the signal within the tank circuit occurs, and thus there is a parametric shift at the output 26 thereof which may be detected by the high input impedance amplifier 28. Referring specifically to comparator circuit 14, the phase shifters 34 and 36 are preset having a specific time constant or period relating to the period of the natural self-resonant frequency of the coil 18 when the tuned circuit 12 was in its quiescent state. Thus, the off-phase signal which appears through amplifier 28 and 32 at the phase shifter 34, and past gain control 68 at phase shifter 36, is out of phase with respect to the period of the time constant of phase shifters 34 and 36, and is manifested as a phase shift with respect thereto. The outputs from phase shifters 34 and 36 therefore vary as the phase of the signal in resonant circuit 12 varies; and the varying outputs from the phase shifters 34 and 36 are noted at the inputs to choppers 38 and 40 which then produce vectorial outputs depending on the amplitude and amount of phase shift of the inputs thereto, when compared to the inputs thereto when the tuned circuit 12 is in its quiescent state.

The AC component of the outputs from choppers 38 and 40 may be integrated and filtered through networks 42 and 44 respectively so that the outputs which appear at output terminals 50 and 52 when an electromagnetic conductor body is detected, can be made compatible to the output readout or display equipment such as oscilloscopes, strip recorders, audio amplifiers, etc.

The phase control 70 of phase shifter 36 may be further adjusted so as to alter the in-phase to quadrature signal ratios appearing at output terminals 50 and 52, depending on the output analysis requirements. The vectorial output from choppers 38 and 40 may also be analyzed with respect to their level, so as to give a quantitative indication with respect to the depth/quality factor of the electromagnetic conductor body; or as a corollary, where other factors are known such as mass, orientation with respect to fixed coils 18 and 20, etc., assay procedures may be carried out by quantitative analysis of the outputs a output terminals 50 and 52.

Other signal parameter changes such as frequency shift or changes of RMS voltage level may be detected in comparator circuit 13 when connected to the output 26 of the tuned detector circuit 12.

As noted, the tank circuit 12 constitutes a positive feedback loop, and with the output 26 thereof appearing as a voltage source to a high input impedance amplifier such as amplifier 28, tank circuit noise is minimized. Overburden noise, which may appear as a factor effecting the parametric shift relationships of the signal output from the tank circuit 12, may tend to increase with a higher natural resonant frequency of the self-resonant coil 18, for the same circuit conditions otherwise; but at the same time, the depth of overburden penetration and therefore the detecting effect of the apparatus according to this invention is increased with the higher resonant frequency of the coil 18.

The apparatus shown schematically in FIGS. 1 and 2 is usually set up and the tank circuit "peaked" so as to place it in its quiescent state as discussed above, by an examination of the output therefrom at 26 using a high impedance device such as an oscilloscope, or a vacuum tube voltmeter. The coupling coefficient between the coils 18 and 20 thereby remains unaffected by any current load placed on the tank circuit.

As indicated, detector apparatus according to the present invention may be set up in a laboratory for quantitative analysis of ore body samples for sulphide content thereof. A useful, assay tool is thereby provided.

The embodiments of the invention in which an exclusive property or privilege is claimed are defined as follows:

1. Apparatus for detecting electromagnetic conductive bodies, including:
   a. a tunable, resonant circuit comprising a first and a second coil, and amplifier means and tunable capacitor means connected in series between said coils; said first coil being self-resonant with a resonant frequency in the audio range; a first end of each of said first and second coils being electrically connected to each other through a ground for said tunable circuit so that each said first end of said coils is at ground potential with respect to said tunable circuit; said first and second coils being rigidly, mechanically mounted with respect to each other so that their inductive axes are substantially mutually perpendicular and so that the inductive coupling between them is minimal; and output means from said tunable circuit across said second coil and with respect to the ground potential of said tunable circuit;

b. a comparator circuit means having an input thereto from the output of said tunable circuit, including a ground for said comparator means electrically connected to said ground of said tunable circuit; said comparator circuit means including means to indicate a shift of a signal parameter of the signal received at the input of said comparator, said shift of a signal parameter being in terms of the comparison of said signal parameter to the state of such signal parameter received from said tunable circuit when in its tuned, quiescent state;

c. said resonant circuit being operative at the resonant frequency of the self-resonant coil so that, in the presence of electromagnetic conductive bodies, said resonant circuit exhibits Q-multiplier effect substantially at the resonant frequency of said first coil.

2. The apparatus of claim 1 where said first coil and said tunable capacitor are each mechanically removable and replaceable in said tuned circuit.

3. The apparatus of claim 2 where said comparator means includes output indicator means to indicate the presence of a shift of a parameter of the input signal thereto with respect to the quiescent state of the signal parameter.

4. The apparatus of claim 2 including quantitative output means in said comparator means to give quantitative indications of the signal parameters of the input signal thereto.

5. The apparatus of claim 2 including means for mounting said tunable circuit remote from said comparator means, and electrical interconnection means there-between.

6. The apparatus of claim 2 including means for mounting said tunable circuit remote from said comparator means, and electrical interconnection means there-between; said means for mounting said tunable circuit being towable from an aircraft and aerodynamically stable when towed thereby; said tunable circuit being mounted in said towable means so that the turns of said first coil assume a substan-tially horizontal position.

* * * * *